UNITED STATES PATENT OFFICE.

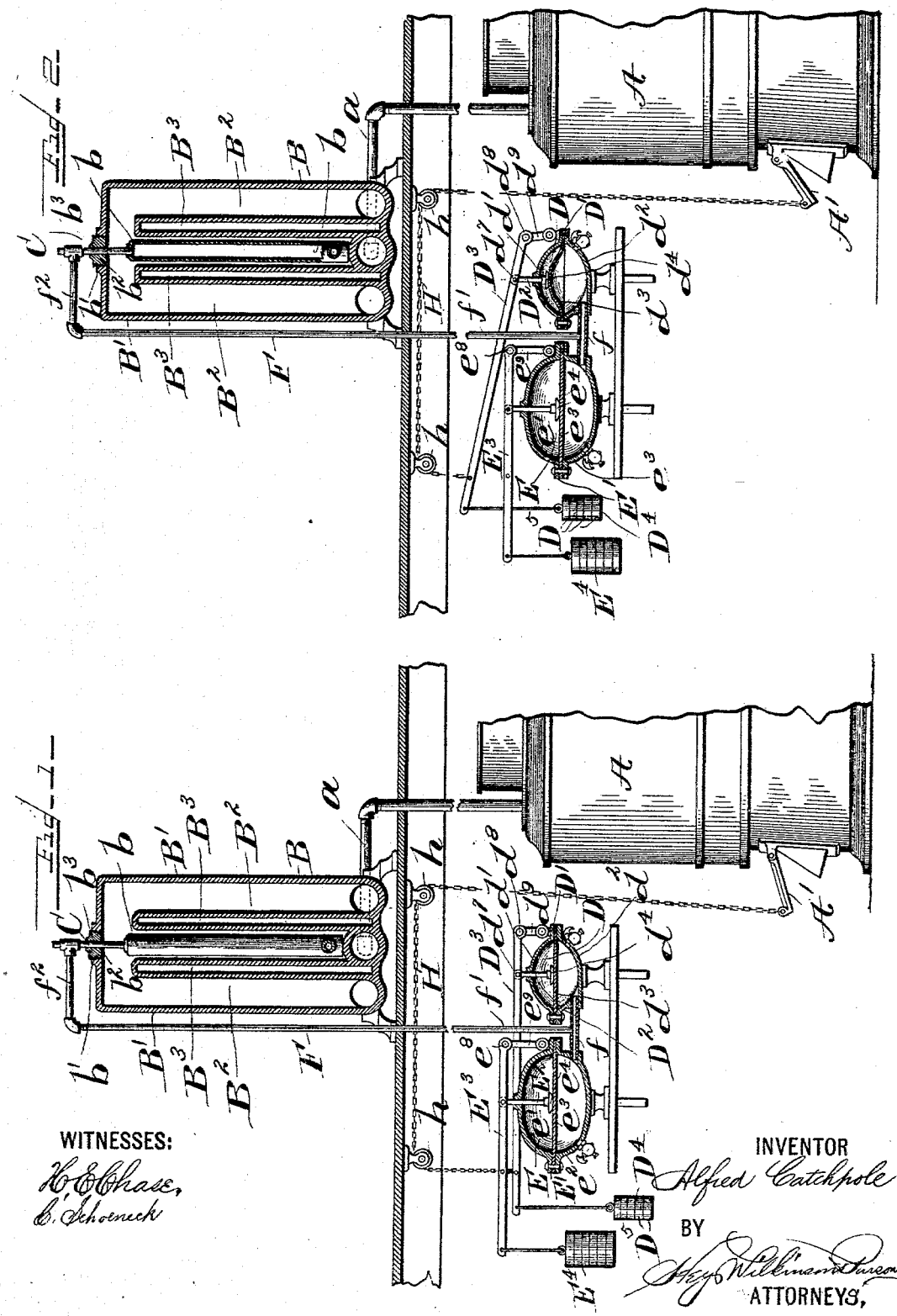

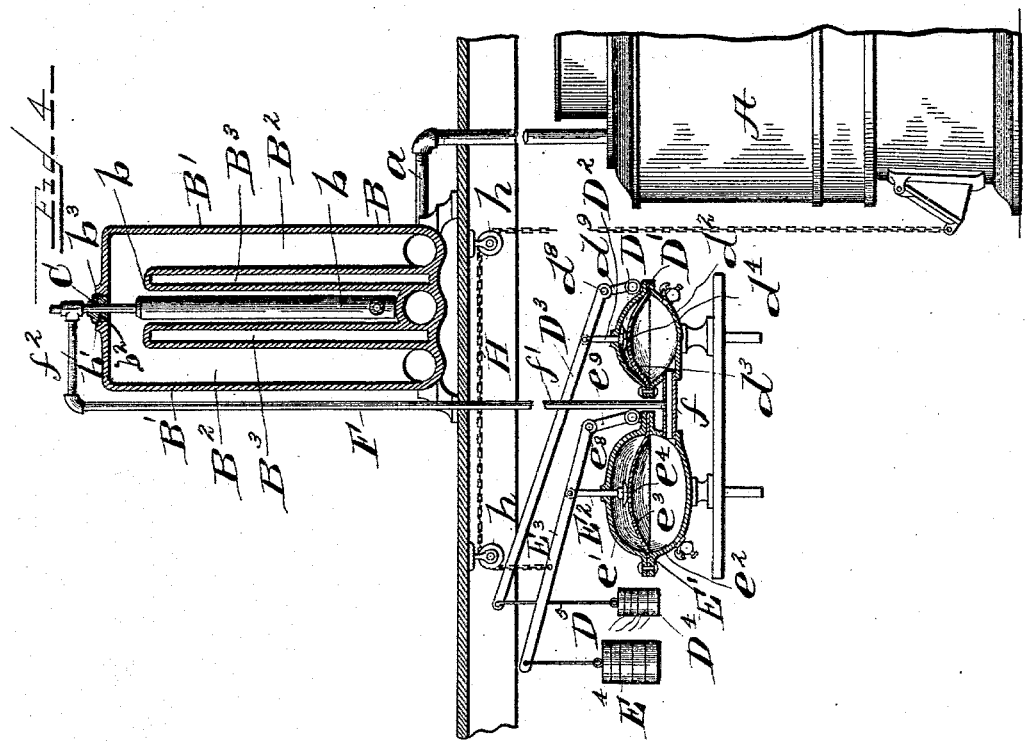
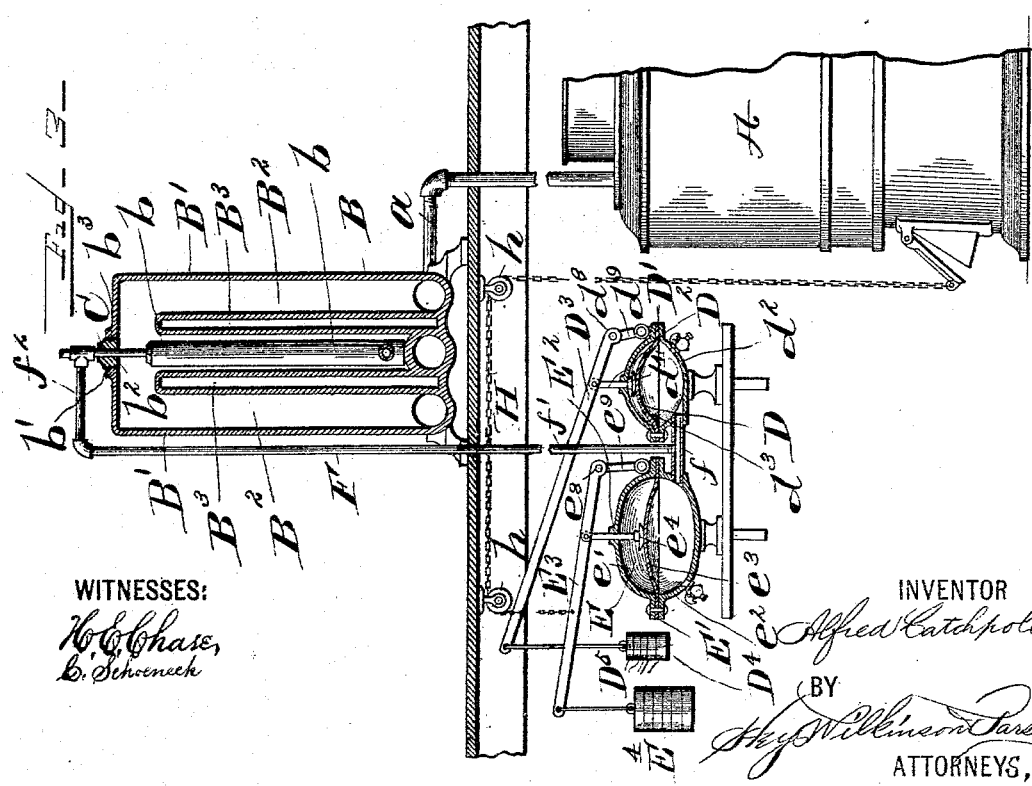

ALFRED CATCHPOLE, OF GENEVA, NEW YORK.

DAMPER-REGULATOR.

SPECIFICATION forming part of Letters Patent No. 514,444, dated February 13, 1894.

Application filed May 20, 1892. Serial No. 433,678. (No model.)

*To all whom it may concern:*

Be it known that I, ALFRED CATCHPOLE, of Geneva, in the county of Ontario, in the State of New York, have invented new and useful Improvements in Regulators, of which the following, taken in connection with the accompanying drawings, is a full, clear, and exact description.

My invention relates to improvements in regulators of the class shown in my application of even date herewith for governing the action of generators of various kinds, and particularly the class designed for heating a circulating fluid as steam or water, and has for its object the production of a simple and effective device so constructed and arranged as to be automatically, positively, and practically brought into action by the expansion and contraction of a body of water; and to this end it consists, essentially, in a heat generator, a chamber connected to the generator for receiving the circulating fluid, a second or expansion chamber heated by the fluid within said chamber, a pressure regulator provided with a water containing or diaphragm chamber connected to said expansion chamber, a second pressure regulator arranged at one side of the former and formed with a water containing or diaphragm chamber of greater capacity than the similar chamber of the former pressure regulator, a water connection between said chambers of the pressure regulators, and a heat controlling device between said generator and diaphragm chambers.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 represents an elevation, partly in section, of my improved regulator connected to a steam radiator and to a detached portion of a steam generator, the rocking levers of both regulators being shown as in their normal position and the draft door of the generator as considerably open. Fig. 2 is a similar view to Fig. 1, the weighted end of the rocking lever of the right hand regulator being shown as considerably elevated and the draft door of the generator as almost closed. Fig. 3 is a similar view to Fig. 2, with the exception that the weighted end of the rocking lever of the right hand pressure regulator is shown as in its extreme elevated position and the corresponding end of the rocking lever of the left hand pressure regulator as slightly elevated and as connected to the draft door, which is almost closed, and Fig. 4 is a similar view to Fig. 3, the free end of the rocking lever of the left hand regulator being shown as considerably elevated and the draft door as closed.

In my aforesaid application of even date herewith I have called attention to the demand existing for a simple and practical regulator for automatically controlling the action of generators and particularly generators connected to steam or hot water heating systems, and also to the fact that, although there have been devised various kinds of regulators adapted to be brought into action by steam and highly volatile liquids, I am unaware that a practical regulator has been constructed which is brought into action by the expansion and contraction of water, and is capable of positive and automatic regulation of the generator at any temperature.

In my aforesaid application I have shown, described and claimed a construction of regulator consisting of a fluid containing chamber and a pair of pressure regulators arranged one above the other and connected to each other and to the fluid containing chamber.

My present invention is differentiated from the former, in that, the two pressure regulators are arranged side by side, are provided with diaphragms of unequal area and are adapted to be alternately connected to the draft door for regulating the action of the generator and maintaining either a high or low degree of heat.

—A— represents a generator, which is of any desirable form, size, and construction, although here shown as a steam generator and as connected by a pipe —a— to a radiator —B—, which may also be of desirable form, size, and construction. The internal chamber —B²— of the radiator —B— is inclosed by the outer shell —B'— and is provided with suitable partitions —B³—B³— between which is supported a closed fluid containing or expansion chamber —b—. Directly above the expansion chamber —b— is an opening —b'— closed by a plug or cap —b²— having a central aperture —b³—. The opening —b'— is of sufficient size to permit the entrance of the chamber —b—, which preferably consists of a thin copper tube, as the same is economical in manufacture and is sensitive to the variations in temperature of the steam or other fluid within the radiator —B—.

—C— is a pipe extending upwardly from the top of the expansion chamber —b— through the opening —b³—.

—D— and —E— represent respectively the right and left hand pressure regulators connected together by a pipe —f—.

—F— is an upright pipe having its lower end —f'— connected to the pipe —f— and its upper end provided with a laterally extending arm —f²— connected to the pipe —C—, thus connecting the chamber —b— with each of the pressure regulators.

The pressure regulator —D— consists of a chamber —D'—, a plunger —D²—, and a rocking lever —D³—, all of which parts may be of desirable form, size, and construction. The chamber —D'— is composed of the upper and lower sections —d'—d²—, and interposed between them is a flexible expansible diaphragm —d³—. The lower end of the plunger —D²— is formed with the curved shoulder —d⁴— bearing upon the diaphragm —d³—, and the upper end of the plunger is hinged at —d⁷—, to the rocking lever —D³—. The short arm of the rocking lever —D³—, is hinged at —d⁸— to a link —d⁹—pivoted to the upper section —d'— of the chamber —D'—. The outer end of this lever is provided with a weight —D⁴— which consists of a series of separable plates or sections —D⁵— for varying the size of the weight.

The second pressure regulator —E— is preferably of similar construction to the former one with the exception that it is of greater capacity, and it is composed of a hollow chamber —E'— having upper and lower sections —e'—e²—, a diaphragm —e³— of greater area than the diaphragm —d³— of the chamber —D'—, a plunger —E²— provided with a shoulder —e⁴—, a rocking lever —E³— having a weight —E⁴—, a pivot —e⁸—, and a link —e⁹— corresponding to the similar parts —D'—d'—, d²—d³—, —D²—d⁴, —D³— d⁸—, and —d⁹— of the regulator —D—. The weight —E⁴— is sufficiently heavy and is so adjusted upon the rocking bar —E³— as to overbalance the weight —D⁴— upon the rocking bar —D³—.

—H— represents a suitable flexible connection between the free weighted end of the rocking lever —D³— and the lower free end of the draft door —A'—, and —h—h— suitable pulleys or other guides for supporting said connection.

At Fig. 1 I have shown both rocking bars of the two pressure regulators as in their normal position, and the draft door as open, and as connected to the rocking lever of the pressure regulator —D— of less capacity. As the water within the chamber —b— becomes heated by the steam within the radiator chamber —B²— it expands and raises the diaphragm —d³— and the rocking lever —D³—, to which the smaller weight —D⁴— is secured, and the diaphragm —e³— and rocking lever —E³— remain at their normal position as shown at Fig. 2. Should the action of the generator be sufficient to increase the expansion of the water within the chamber —b— the free end of the lever —D³— is elevated to its extreme upward position, shown at Fig. 3, and the additional expansion of the water is received in the chamber —E'—, which becomes a safety or surplus chamber and the free end of the lever —E³— is then elevated. The combined area of the two chambers —E'—D'— as in my aforesaid application is sufficient to receive the utmost possible expansion of the water within the shell —b— in order to positively obviate breakage of the parts of the pressure regulator —D—, and to render my regulator practical and efficient.

At Figs. 3 and 4 I have shown the connection —H— as connected to the rocking lever —E³— of the regulator —E— of greater capacity, as the rocking lever —D³— has reached its limit of upward movement and would be ineffectual to close the draft door, which is shown as partly open at Fig. 2. It is evident, however, that as the lever —E³— continues its upward movement, the draft door is closed and the action of the generator checked. As described the light weight is secured to the lever —D³—, and this lever is utilized to regulate the generator when a low heat is required, since a slight expansion of the water within the chamber —b— produces a sufficient movement of the diaphragm —d³— to effectually operate the lever —D³—, and the lever —E³— is utilized to regulate the generator when a greater temperature is required, as it requires a greater expansion of the water to elevate the lever —E³—. It will be evident, however, that the weights —D⁴—E⁴— may be transposed and that the lever —E³— may be used for regulation at a low temperature and the chamber —D'— for a safety or surplus device for the chamber —E'—, but such is not the preferable arrangement. The levers —D³—E³—, the weights —D⁴—E⁴—, the connection —H—, and the draft door —A'— thus form essentially a heat controlling device which is connected to and controlled by either of the diaphragms —d³—e³—.

The operation of my invention will be readily perceived from the foregoing description and upon reference to the drawings, and it will be noted that the same is particularly simple, effective, and practical, and that the generator may be regulated to maintain the water of the regulator at either a high or low temperature, and that, when the rocking lever of one pressure regulator reaches the limit of its movement, the other pressure regulator acts as a safety or surplus device. The efficiency and practicability of my invention are principally due to the fact that it contains two diaphragm chambers of unequal capacity provided with diaphragms of unequal area, and so arranged and constructed that the combined capacity of both chambers is sufficient to receive the utmost expansion of the water within the chamber, the expansion chambers, and the connections between said chambers, and that either diaphragm chamber may be used to regulate the action of the generator and the other as a surplus chamber for the one effecting the regulation. To illustrate: If it is desired to regulate the generator, so as to heat the water in the diaphragm chambers to but a low temperature then it is advisable to connect the draft door connection to the lever operated by the diaphragm of greater area, as a limited degree of expansion produces a greater movement of said diaphragm than a similar degree of expansion produces of the diaphragm of less area. The diaphragm chamber of less capacity then operates as a surplus chamber after said diaphragm of greater area has been expanded to its utmost limit. On the contrary, if it is desired to regulate the generator so as to heat the water in the diaphragm chambers to a considerable heat, then it is advisable to connect the draft door connection to the lever operated by the diaphragm of less area, as a considerable degree of expansion produces a less movement of said diaphragm than a similar degree of expansion produces of the diaphragm of greater area. In this case the diaphragm chamber of greater capacity operates as the surplus chamber after the diaphragm of greater area has been expanded to its utmost limit. Consequently by the use of diaphragms of unequal area I am enabled to control the operation of the heat generator as easily when the water in the regulator is of a low temperature as when it is considerably heated, and this control is effected without nicety of adjustment of levers or weights the efficiency of which would be more or less affected by unskilled or careless attendants, or exterior influences common to cellars in which heat generators are usually placed.

As the detail construction and arrangement of the parts of my regulator may be considerably changed without departing from the spirit of my invention, I do not herein limit myself to such precise detail construction and arrangement.

I am aware that two pressure regulators of equal area have been connected by a pipe containing a column of mercury, but I do not herein claim such construction.

Having thus fully described my invention, what I claim as new, and desire to secure by Letters Patent, is—

1. The combination with a heat generator having a draft door; of a radiator separate or remote from and heated by the generator and formed with a chamber for the circulating fluid, an upright expansion chamber unconnected with the former chamber arranged within said chamber beneath its top wall and having its lower end supported upon the base of the former chamber, a movable plug in said top wall of the former chamber for permitting entrance and removal of said inner chamber, a water containing pipe passed through the plug in the top wall of the former chamber and having one end connected to the latter chamber, a pressure regulator connected to said water containing pipe, a lever operated by said pressure regulator, and a flexible connection between said lever and the draft door, substantially as and for the purpose set forth.

2. The combination with a heat generator having a draft door, and a chamber for a circulating fluid connected to the generator, an expansion chamber arranged in proximity to said chamber, whereby the former chamber heats the latter, a pipe having one end connected to the latter chamber, a pressure regulator having a chamber connected to the pipe and provided with an expansible diaphragm, a second pressure regulator arranged at one side of and connected to the former pressure regulator and having a chamber of greater capacity than the corresponding chamber of the former pressure regulator and provided with an expansible diaphragm of greater area than the former expansible diaphragm, a connection from the draft door and levers operated by the diaphragms and provided with adjustable weights, said levers being so relatively arranged and constructed that either is connected at will to said draft door connection, substantially as specified.

3. The combination with a heat generator and a chamber for a circulating heating fluid connected to the generator, an expansion chamber arranged in proximity to the former chamber, whereby the former chamber heats the latter, a diaphragm chamber connected to the expansion chamber, a second diaphragm chamber arranged at one side of and connected to the former chamber and provided with a diaphragm of greater area than that of the former chamber, a connection from the draft door and levers operated by the diaphragms and provided with adjustable weights, said levers being so relatively arranged and constructed that either is connected at will to said draft door connection, substantially as and for the purpose set forth.

4. The combination with a heat generator and a chamber for a circulating heating fluid connected to the generator, an expansion chamber arranged in proximity to the former chamber, whereby the former chamber heats the latter, a diaphragm chamber connected to the expansion chamber, a second diaphragm chamber arranged at one side of and connected to the former chamber and provided with a diaphragm of greater area than that of the former chamber, weighted levers connected to the diaphragms of the diaphragm chambers and so arranged that one diaphragm is elevated before the other, a connection from the draft door and levers operated by the diaphragms and provided with adjustable weights, said levers being so relatively arranged and constructed that either is connected at will to said draft door connection, substantially as and for the purpose described.

5. The combination with a heat generator having a draft door; of a radiator separate or remote from and heated by the generator and formed with a chamber for the circulating fluid, an upright expansion chamber unconnected with the former chamber, arranged within said chamber beneath its top wall and having its lower end supported upon the base of the former chamber, a water containing pipe passed through the top wall of the former chamber and having one end connected to the latter chamber, a pressure regulator arranged beneath the radiator and provided with a water containing chamber connected to said pipe, a second pressure regulator arranged at one side of the former pressure regulator and formed with a water containing chamber of greater capacity than the water containing chamber of the former pressure regulator, a water connection between the water containing chambers of the pressure regulators, levers operated by said pressure regulators and means for connecting either lever with the draft door, substantially as and for the purpose set forth.

In testimony whereof I have hereunto signed my name, in the presence of two attesting witnesses, at Syracuse, in the county of Onondaga, in the State of New York, this 9th day of May, 1892.

ALFRED CATCHPOLE.

Witnesses:
CLARK H. NORTON,
L. M. BAXTER.